UNITED STATES PATENT OFFICE.

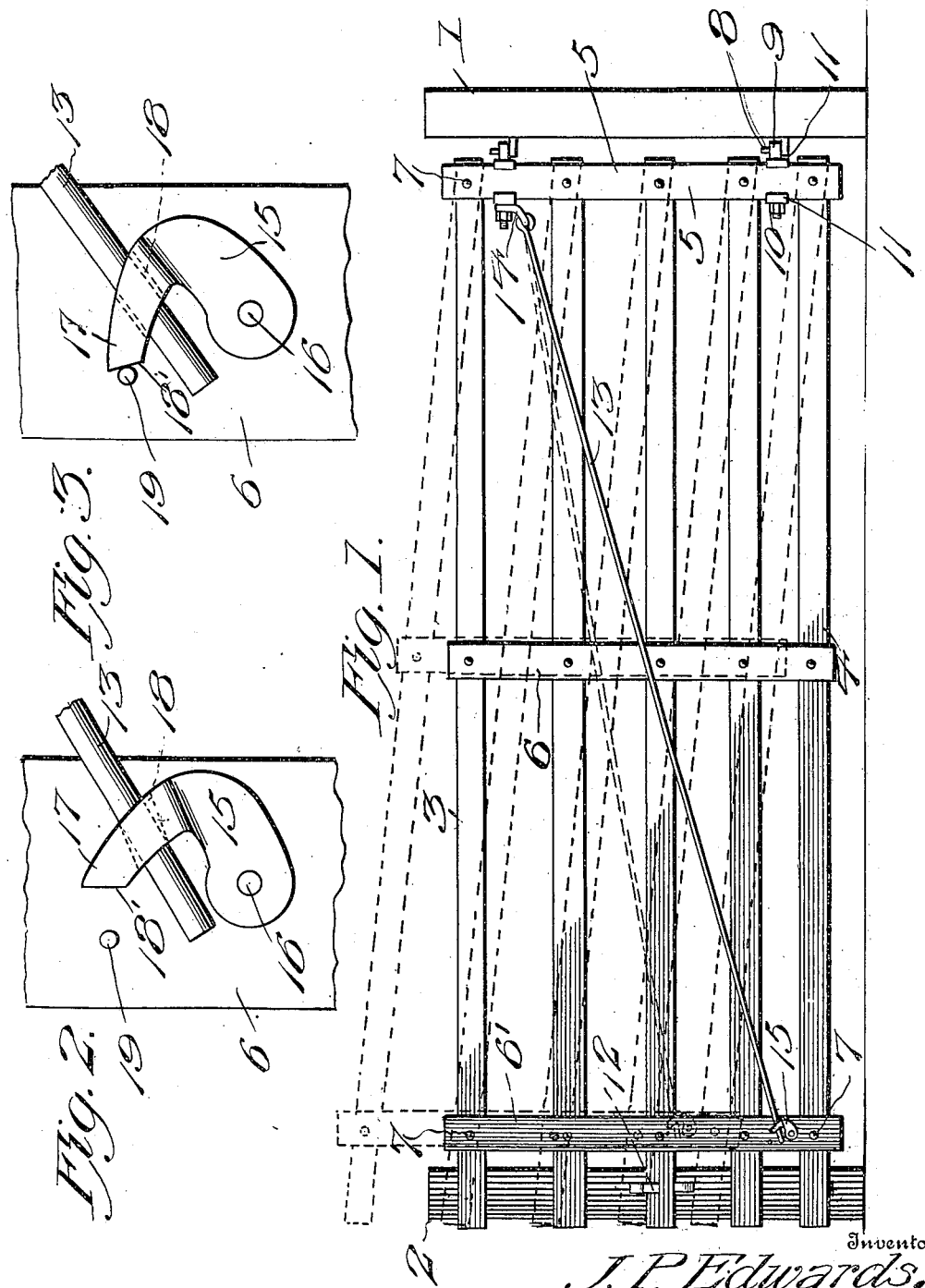

JOSIAH P. EDWARDS, OF SHIRLEY, INDIANA.

GATE.

No. 825,267.　　　　Specification of Letters Patent.　　　　Patented July 3, 1906.

Application filed March 17, 1906. Serial No. 306,613.

*To all whom it may concern:*

Be it known that I, JOSIAH P. EDWARDS, a citizen of the United States of America, residing at Shirley, in the county of Hancock and State of Indiana, have invented new and useful Improvements in Gates, of which the following is a specification.

This invention relates to improvements in swinging gates, the object of the invention being to provide a simple and inexpensive gate structure which will permit of the ready adjustment of the free end of the gate to prevent sagging or to adapt the gate to swing over snow-drifts and other obstructions or to form a gap for the passage of small stock—such as hogs, sheep, &c.—while preventing the passage of horses, cows, and other large stock, and also to enable the gate to be elevated and locked in any desired elevated position and adjusted to such an elevation as to allow it to swing open in either direction.

A further object is to provide a gate which may be used on a hillside and opened uphill and which when swung open will stand without propping.

In the accompanying drawings, Figure 1 is a side elevation of the gate. Fig. 2 is a detail view showing the clutch or cam dog in locking position. Fig. 3 is a similar view showing the clutch or cam dog in release position.

Referring to the drawings, the numerals 1 and 2, respectively, designate the hinging and latch posts of the gate structure, and 3 a horizontally-swinging gate, which may be of any construction that will secure the functional characteristic hereinafter set forth, but, as shown in the present instance, comprises a series of parallel longitudinal slats or bars 4 and pairs of vertical pickets or slats 5, 6, and 6', arranged, respectively, at the hinging end, the center, and adjacent the free end of the gate. The pairs of vertical bars are arranged on opposite sides of the longitudinal slats and are connected therewith by transverse pivot-bolts 7, adapting the slatted body and pickets 6 at the free end thereof to swing in a vertical plane.

The hinge connections between the gate and post 1 comprise stationary pintles 8 on said post and eyebolts 9 on the gate, which bolts pass between the slats or pickets 5 and are provided with clamping-nuts 10, flanged clips 11 being arranged upon the bolts to bridge the space between and grip the pickets 5 to hold the bolts firmly in connection therewith. The free ends of the longitudinal slats 4 extend beyond the pickets 6 and are adapted to engage a keeper 12 on the post 2. This keeper is preferably formed with an entrance-notch which may face either upwardly or downwardly to receive the upper or lower edge of the free end of either one of the longitudinal slats.

A stay-rod 13 extends diagonally at one side of the gate and is pivoted at its upper end to the gate in any suitable manner, as by pivotally connecting it with a bracket-plate 14, connected with the upper hinge member, and the lower or free end of the rod is arranged to coöperate with an eccentric clutch or locking-dog 15. This clutch or dog comprises a plate pivoted upon one of the slats or one of the vertical pickets 6, as indicated at 16, and having at its free end an upwardly and forwardly projecting curved or hooked lug 17, having a guide-passage for the rod and a beveled free end 18' to engage a stationary stop-pin 19 on the picket.

The pivot member 16 is so disposed that when the dog is in locking position, as shown in Fig. 2, the weight of the gate, falling on the rod 13, will be transmitted to the pin 16 and to the lug 17, thus locking the rod from movement to maintain the gate in adjusted position. When the dog is pitched forward to the position shown in Fig. 3, the rod is free to slide through the passage 18 and the slats of the gate to swing vertically on the pivots 7. It will thus be understood that the rod 13 connects the ends of the gate to hold the slats in fixed relation and prevent them from moving on their pivotal connection, and that when the rod is free to slide through the clutch the gate may be swung upward or downward to any desired degree or angle, as indicated in dotted lines in Fig. 1, and locked in such position by adjusting the dog to its locking position. When the dog is thrown forward, the gate may be released from the latch 12 and adjusted upwardly or downwardly the space of one or more slats, or, if desired, it may be elevated until its free end extends above the post 2, so that the gate may be swung in either direction. It will be understood that after the gate is lifted to a point slightly above the elevation to which it is to be adjusted it will be automatically locked in such position upon its downward movement through the pressure of the rod 13 on the dog, whereby the latter will be swung to the position shown in Fig. 2.

Of course the rod may be arranged at a different diagonal position, and it will be apparent that the construction described permits of the ready adjustment of the gate for the purposes set forth, and that the structure is simple and adapts the gate to be manufactured at a very low cost.

Having thus described the invention, what is claimed as new is—

1. In combination, a swinging gate having its portions pivoted to swing upward at an angle, an eccentric locking-dog pivotally mounted upon one portion of the gate and having a passage, and a stay-rod pivoted at one end to another portion of the gate and extending at its free end through said passage in the dog, said dog being adapted to swing to one position to permit the rod to have free sliding movement in said passage and the gate to be adjusted and to another position to cause the rod to bind against the wall of the passage and to thereby lock said rod against movement and hold the gate in adjusted position.

2. In combination, a swinging gate having its portions pivoted to swing upward at an angle, a rod pivoted at one end to one portion of the gate, and a dog pivoted to another portion of the gate and frictionally engaging the rod, said dog being adapted to swing in one direction to permit the rod to have free movement and the gate to be adjusted and to another position to lock the rod against movement and hold the gate in adjusted position.

3. In combination, a horizontally-swinging gate having its portions pivoted to swing vertically at an angle, a diagonal stay-rod pivoted at one end to one end of the gate, an eccentric dog mounted upon the opposite end of the gate and having an opening for the passage of the other end of the rod and a stop on the gate to limit the release movement of the dog.

4. In combination, a horizontally-swinging gate having its portions pivoted to swing vertically at an angle, a dog pivotally mounted upon one end of the gate and having an eccentric projection provided with a passage, a diagonal stay-rod having its free end projecting through said passage and its other end pivoted to the other end of the gate, and a stop on the gate to engage and limit the release movement of the dog.

5. A horizontally-swinging gate having its portions pivoted to swing vertically at an angle, and provided with a diagonally-extending stay, said stay being pivoted to one end of the gate, and a dog upon the other end of the gate with which the free end of the rod has sliding engagement, said dog being adapted to swing to one position to permit the rod to have free movement and the gate to be adjusted and to another position to lock the rod against movement and hold the gate in adjusted position.

In testimony whereof I hereunto affix my signature in presence of two witnesses.

JOSIAH P. EDWARDS.

Witnesses:
VIRGIL WALES,
LEWIS E. STANLEY.